United States Patent Office 2,709,920
Patented June 7, 1955

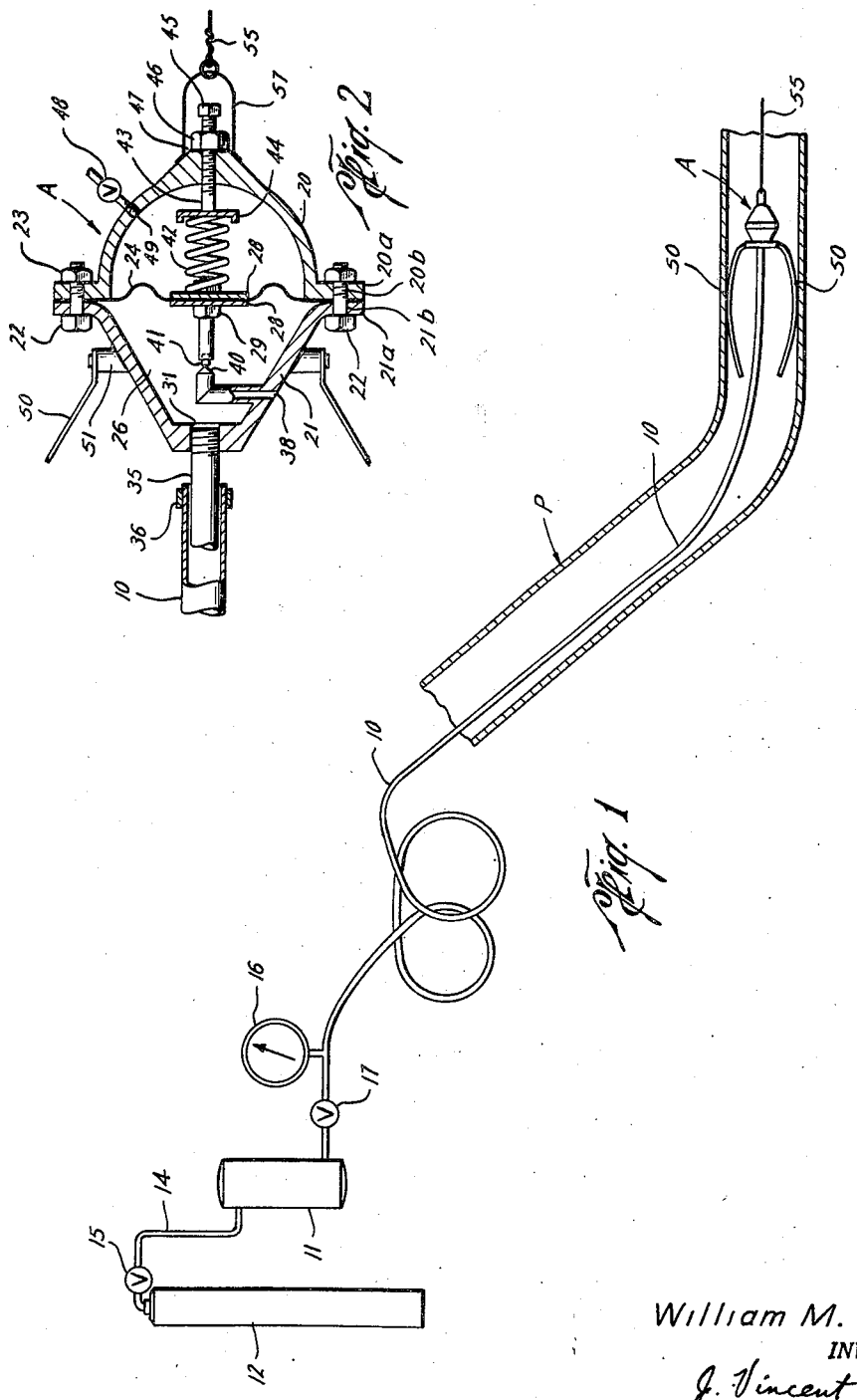

2,709,920

DETERMINATION OF ELEVATIONS

William M. Moore, Shreveport, La., assignor to United Gas Corporation, Shreveport, La., a corporation of Delaware Application January 12, 1953, Serial No. 330,847

6 Claims. (Cl. 73—432)

This invention relates to new and useful improvements in the determination of elevations.

It is often necessary to determine the depth of a hole in the ground, the depth of water, or the distance above or below ground level at which an object is disposed, or other similar elevations. Such determinations can be readily made if a true vertical can be established such as with a plumb-bob, since then the true vertical distance from ground level can be measured with a measuring tape. However, when attempting to measure the depth of a crooked hole, that is, a hole at an angle to the vertical, such a direct measurement is impossible. The same difficulty exists when attempting to determine the depth of a fluid such as water since there the movement of the fluid prevents an accurate positioning of a plumb-bob or similar weighted device. Likewise, when an object such as a pipeline, is located in a crooked hole or below a fluid, the same difficulties are encountered in determining its elevation.

For example, pipelines, for carrying oil, gas, water and the like, frequently must be laid across rivers or bodies of water. In such laying of pipelines, a trench is dug in the bed of the river and the pipe is laid therein. Conventionally, the elevation of the pipeline is determined by using sounding tapes or lead lines operated from small boats. The measurements made by these methods are not reliable due to the difficulty in locating the position of the pipe from the surface. In fact, it is not uncommon for the current, boat traffic, or other conditions such as weather, to make the location of the pipe so difficult that a diver must be employed to assist in the location of the pipe.

After the pipeline is surveyed or profiled by the above procedures, the trench and the pipe therein are covered or back-filled with several feet of clay and mud. The back-filling might cause the pipeline to be floated off the trench bottom, buckled, or otherwise moved from its expected location. This condition makes a second survey or profiling of paramount importance. This is particularly true whenever the crossing is beneath a stream that is navigable, as certain requirements as to depth and location are specified by the U. S. Corps of Engineers.

The second survey, due to the back-filling, is much more difficult than the first and generally requires the use of probes and spuds for locating the pipe. The difficulties of this second profile operation are multiplied when the depth of the water over the pipe is greater than twenty feet because the use of probes and spuds at such depths becomes particularly awkward and unreliable.

Other types of equipment than that mentioned above which are known and have been tried for determining the elevation of objects such as a pipeline include electric detection devices and liquid depth indicators, neither of which is satisfactory. The liquid depth indicators determine the pressure of the liquid at a particular depth by bubbling gas through a tube and the pressure required to overcome the liquid head is gauged. Knowing the liquid head and the density of the liquid, the depth of such liquid can then be calculated. As can be readily appreciated, the liquid depth indicator is usable only in a liquid, which is disadvantageous in many cases, particularly where the elevation is to be determined in a gaseous medium. Thus, if a pipeline across a body of water is to be profiled, that is, the elevation of the pipeline at various points determined, then such pipeline must be filled with a liquid to make the determinations. The profile of the pipeline may be such that air traps or pockets are formed in the liquid with a resultant error in the determination. Then, when the testing is finished, the problem of removing the water or other liquid from the pipeline is present.

It is therefore an object of this invention to provide an improved means for determining various elevations in fluids without regard to the fluid medium in which such determination is made, and particularly where the medium is gaseous.

An important object of this invention is to provide an improved pressure valve for connection with a liquid pressure source, in the determination of elevation in fluids wherein the valve is unaffected by the fluid medium in which the determination is made.

Another object of this invention is to provide an improved apparatus for determining elevations in which a fluid conductor has connected therewith a pressure gauge at a first elevation and a pressure valve at a second elevation, which valve is adapted to open at a predetermined pressure, whereby the difference between the reading on the pressure gauge and said predetermined pressure provides a determination of the difference in elevation between said first elevation and said second elevation.

A particular object of this invention is to provide an improved diaphragm valve wherein fluid under pressure acts on one side of said valve while substantially the only force acting on the other side thereof is a resilient means which holds the valve closed until the pressure of said fluid overcomes the predetermined force of said resilient means.

The construction designed to carry out the invention will be hereinafter described together with other features thereof. The invention will be more readily understood from a reading of the following specification and by reference to the accompanying drawings forming a part thereof, wherein an example of the invention is shown, and wherein:

Figure 1 is an elevational view illustrating the various parts of the elevation determining apparatus of this invention, with the parts being in a typical position for determining an unknown elevation in a pipeline.

Figure 2 is a detail sectional view of the valve which is preferably used in the apparatus of Figure 1.

In the drawings, the letter A designates generally a pressure valve which is disposed at an unknown elevation in a pipeline P, or any other similar unknown elevation. A hose or fluid conductor 10 is connected to the valve A and is of substantial length so that it extends to a liquid supply tank 11 and is connected therewith. The liquid in the tank 11 may be water or any other similar liquid which is placed under pressure by a gas supply in tank 12, which is connected to the liquid supply tank 11 through a pipe 14. The gas in the tank 12 is under high pressure so that when the valve 15 in the line 14 is open, the gas will force downwardly on the liquid in tank 11 to apply a pressure thereto. A pressure indicator or gauge 16 is connected to the conductor or conduit 10 at a point between the valve A and the liquid supply 11, but such indicator or gauge 16 is disposed a sufficient distance from the valve A to permit its location at a known elevation, preferably at ground level and outside of the pipeline P, whereby the pressure can be readily read. A control valve of any conventional construction is indicated at 17 and such valve 17 is disposed in the conductor or conduit 10 between the supply of liquid 11 and the pressure indicator or gauge 16. As will be explained, the valve A is set to open or discharge fluid from the conductor or conduit 10 at a predetermined pressure, which is determined by the setting of the valve closing force. When sufficient pressure has been developed with the fluid being supplied to the valve A to open same for the discharge of the fluid therefrom, the difference between the reading on the gauge 16 and the predetermined and known pressure at which the valve A opens is a direct measure of the vertical difference in elevation between the valve A and the pressure gauge 16.

In order to make elevation determinations with the apparatus illustrated in Figure 1 in any fluid medium, either liquid or gaseous, the particular valve A shown in detail in Figure 2 is preferably used. The valve body may be formed into sections, a spring section 20 and a fluid section 21. When the valve body is formed in the two sections 20 and 21, radial flanges 20a and 21a are formed on the sections 20 and 21 respectively, with the flanges 20a and 21a having aligned openings 20b and 21b therein for the reception for a securing means such as bolts 22 with nuts 23 secured thereto. It will be appreciated that the sections 20 and 21 could be united by welding or other known securing means, or could be a single piece, but it is more convenient for assembly and replacement to utilize the bolts 22 and nuts 23 (Figure 2).

A flexible diaphragm 24 is connected to the body and is disposed completely thereacross with the peripheral edge thereof being held between the adjacent flanges 20a and 21a, so that the valve body, on the interior thereof, is divided into two separate chambers 25 and 26. The chamber 25 may be designated the spring chamber while the chamber 26 may be designated the fluid chamber. These chambers 25 and 26 are entirely closed off from each other by the resilient diaphragm 24 which is constructed of a flexible material such as rubber or any equivalent rubber-like material.

The rubber diaphragm 24 may be reinforced by metallic discs 28 disposed on each side of the diaphragm in approximately the central portion thereof, but not extending to the valve body so as not to interfere with the flexibility of the diaphragm 24. The discs 28 are fixed to the diaphragm 24 by nuts 29 threaded thereagainst on a stud 30 extending through the center of the diaphragm 24.

The valve body has an inlet 31 to which is connected the flexible hose 10, by threads or any known method of connection. As shown in the drawings a short metal nipple 35 may be utilized for connecting the hose 10 to the valve body at the opening 31, in which case the hose 10 is secured to the nipple 35 by a clamp 36, and the nipple 35 is threaded into the inlet 31. With the hose 10 thus connected to the valve body, fluid can pass into the fluid chamber 26 of the valve body and act against or upon the side of the diaphragm 24 facing the chamber 26. The valve body also has an outlet 38 from the fluid chamber side of the diaphragm 24 which as shown (Figure 2) may take the form of an L with the open inner end of the outlet 38 having a valve seat 40 formed substantially parallel to the diaphragm 24. The stud 30 has on its lower end a seating surface or member 41 which closes the outlet 38 by seating on the valve seat 40. The valve seating member 41 is maintained against the seat 40 by the resilient means or spring 42 disposed in the spring chamber 25 and acting against the side of the diaphragm 24 facing the spring chamber 25. The spring 42 can be regulated as to the amount of force applied on the diaphragm and the valve seat 40 by a threaded rod 43 which has an engaging head 44 in contact with the spring 42. The rod 43 is threaded into the valve body section 20 at an angle substantially perpendicular to the plane of the diaphragm 24. The threading of the rod 43 can be effected with a wrench on the flat surfaces 45 on the exposed end thereof, as is well known. The spring, once adjusted to its predetermined pressure, can be maintained in such position by the lock nut 46 and washer 47 which abut against the valve body section 20 to prevent further turning of the threaded rod 43. Thus, any predetermined pressure or force may be applied to the diaphragm 24 from the spring 42, and consequently any predetermined pressure may be set for the opening of the outlet 38 by movement of the valve seating surface 41 away from the valve seat 40.

In order to eliminate any closing force other than such predetermined pressure of the spring 42, it is particularly desirable to evacuate the spring chamber 25. This can most effectively be accomplished by the use of a needle valve 48 which is connected to an opening 49 in the valve body section 20. The vacuum can be effected with the valve 48 open and thereafter the valve 48 will be closed during use. It will be appreciated that temperature and pressure conditions to which the valve A may be subjected would therefore not affect the closing force applied to the diaphragm 24 by the spring 42. In fact, substantially the only force applied to the diaphragm 24 from the spring side thereof would be the force caused by the spring 42.

The operation of the valve A involves the control of the pressure at which fluid is discharged from the outlet 38. Fluid under pressure, and particularly liquid under pressure, is forced through the holes or conductor 10 into the inlet 31 and the fluid chamber 26. When the fluid pressure reaches an amount sufficient to overcome the force of the spring 42, the diaphragm 24 will move upwardly and carry therewith the stud 30 and the valve seating member 41 whereby the outlet 38 is open and the fluid may discharge therefrom.

In carrying out the invention, the valve A is placed at an unknown elevation, for example in a pipeline P at some point therein, and the valve A is preferably centralized by means of flexible metallic centralizer arms 50 connected to the valve body at flanges 51 by welding, or any other known securing means. If desired, the centralizer arms or members 50 could be connected to the bolts 22 or an equivalent portion of the valve body. Ordinarily, there will be three of the centralizer bar or members 50, although the number can vary so long as there are enough to centralize the valve A. The valve A may be pulled into the pipeline P by a tow line 55 which is connected to the valve body by a wire loop 57 which is secured to the body. The tow line 55 therefore serves to position the valve A at various unknown elevations in the pipeline P so that the entire pipeline may be surveyed or profiled by determining the elevation of the pipeline at various points therein.

When the valve A is positioned at a particular point of unknown elevation, such as in the pipeline P, the valve 17 is opened and liquid under pressure from the tank 11 is forced through the hose or conductor 10 until the pressure reading on the gauge 16 is substantially constant, indicating the valve A has opened and is discharging fluid from the end of the hose. At that time, the valve 17 is closed, whereupon the liquid continues to discharge from the valve A until the predetermined pressure of the spring 42 is sufficient to close the outlet 38, at which time the hose 10 is a closed system entirely between the valve 17 and the valve A. The indicator 16 can then be read, and since it is at a known elevation such as the ground level outside of the pipeline P, the fluid pressure in the hose 10 will be indicated at that known elevation. The pressure acting on the valve A will be the combined pressure of the liquid as indicated at the known elevation by the indicator 16 plus the liquid pressure due to the difference in elevation between the valve A and the indicator 16. This pressure will of course depend upon the density of the liquid being used in the hose 10, which density is easily determined prior to the test.

The predetermined pressure at which the valve A opens is known because it has been previously set, for example, by placing the valve A at the same elevation as the indicator 16 while carrying out the same steps as outlined above. When the valve A and the indicator gauge 16 are at the same elevation while the setting is made, the indicator gauge 16 will read the pressure at which the valve A is set to open. Thus, when the valve A is placed at an unknown elevation, the difference between the reading on the indicator gauge 16 and the predetermined pressure at which the valve A is set to open is a measurement of the head or pressure of the liquid in the hose 10, and since liquid head is a function only of the vertical column of the liquid and the density thereof, the vertical difference between the known elevation at which the indicator is located and the unknown elevation at which the valve A is located can readily be calculated. In fact, with a liquid of a known density, the indicator gauge 16 can be calibrated in feet, or feet and/or inches, so that the difference in elevation between the indicator gauge 16 and the valve A can be read directly on the indicator 16.

In some cases, the valve A may be disposed above the indicator 16 in which event, the pressure reading on the gauge 16 will be greater than the predetermined pressure at which the valve A discharges due to the fact that the pressure then must be sufficient to overcome the elevation of the valve A above the indicator 16. However, the unknown elevation will still be determined by the difference between the indicated pressure reading at 16 and the predetermined pressure at wihch the valve A is set to discharge.

As has been previously pointed out, the particular pressure valve of Figure 2 has a vacuum on the spring side of the diaphragm 24 so that the pressure at which the valve is set to open or discharge is unaffected by the temperature or pressure of the fluid medium in which the valve A is disposed for the elevation determination. The auxiliary needle valve 48 on the valve A may be open or even eliminated and the opening 49 utilized without such valve 48 if the pipeline P, or if pipeline P contains only air or other gas, or the valve A is at some unknown elevation in a gaseous medium, because the effect of the gas as compared to the liquid pressure being supplied through the conductor 10 will be immaterial. If the valve 48 is eliminated when the valve A is inserted in a liquid, the pressure of the liquid outside of the valve A would have to be accounted for, but in the usual pipeline measurements, the pipeline P is substantially empty of liquid and would contain only air or other gas which would not affect the predetermined pressure at which the valve is set to open due to the much greater pressures employed with the liquid from the tank 11.

It should be understood that the air pressure supply or gas pressure supply 12 illustrated in the drawings and described above could be any conventional means for applying pressure to the liquid in the tank 11.

The foregoing disclosure and description of the invention is illustrative and explanatory thereof and various changes in the size, shape and materials, as well as in the details of the illustrated construction may be made, within the scope of the appended claims, without departing from the spirit of the invention.

What is claimed is:

1. An elevation determining apparatus comprising, a fluid conductor, a pressure valve at one end of said conductor, a source of liquid under pressure having connection with said conductor at a point remote from said one end, a pressure indicating means connected to said conductor at a point remote from said one end and between said valve and said source of liquid under pressure, and means in said valve for maintaining said valve closed until the liquid pressure in said conductor acting on said valve reaches a predetermined pressure, whereupon said valve opens to discharge the liquid from said conductor, said pressure indicating means and said valve being disposable at different elevations whereby the difference between the pressure indicated on said indicating means and said predetermined pressure provides a determination of the difference between said elevations.

2. The apparatus set forth in claim 1, including a control valve in said conductor for shutting off liquid flow from said source of liquid to said pressure indicating means, said valve being closed when the pressure acting on said valve is at least as great as said predetermined pressure.

3. The apparatus set forth in claim 1, including a tow line having connection with said conductor at said one end so that said conductor can be pulled through a pipeline, and guide means on said valve for maintaining same out of contact with the pipeline when being pulled therethrough with the conductor.

4. The apparatus set forth in claim 1, wherein said pressure valve includes a diaphragm which has one side thereof acted upon by said liquid under pressure and the other side thereof acted upon by said means in said valve for maintaining said valve closed, said other side being substantially evacuated and closed while determining an elevation so as to be unaffected by the pressure of the medium in which said valve is disposed when the determination is made.

5. An elevation determining apparatus including, a pressure valve, a source of liquid under pressure, a flexible conduit connecting said valve and said source, a pressure indicator connected to said conduit between said valve and said source, said conduit being of sufficient length between said valve and said indicator so that said indicator may be placed at a known elevation while said valve is placed at an unknown elevation a substantial distance above or below said known elevation, said valve having a means therein for maintaining same closed until a predetermined pressure is applied thereto whereupon the difference between said predetermined pressure and the pressure reading on said indicator provides a determination of the liquid head from said known to said unknown elevation.

6. The apparatus set forth in claim 5, wherein said pressure valve includes a diaphragm which has one side thereof acted upon by said liquid under pressure and the other side thereof acted upon by said means in said valve for maintaining said valve closed, said other side being substantially evacuated and closed while determining an elevation so as to be unaffected by the pressure of the medium in which said valve is disposed when the determination is made.

References Cited in the file of this patent

UNITED STATES PATENTS

| | | |
|---|---|---|
| 1,631,909 | Badin | June 7, 1927 |
| 2,074,292 | Wilkins | Mar. 16, 1937 |
| 2,284,707 | Wilson | June 2, 1942 |
| 2,645,128 | Walker et al. | July 14, 1953 |

OTHER REFERENCES

Geophysics, vol. 16, No. 3, July 1951, pp. 486–493.